United States Patent
Hasegawa et al.

(10) Patent No.: US 9,799,925 B2
(45) Date of Patent: Oct. 24, 2017

(54) NONAQUEOUS ELECTROLYTE SECONDARY BATTERY

(71) Applicant: SANYO Electric Co., Ltd., Daito-shi, Osaka (JP)

(72) Inventors: Masaki Hasegawa, Osaka (JP); Takayuki Shirane, Osaka (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 126 days.

(21) Appl. No.: 14/779,739

(22) PCT Filed: Mar. 6, 2014

(86) PCT No.: PCT/JP2014/001256
§ 371 (c)(1),
(2) Date: Sep. 24, 2015

(87) PCT Pub. No.: WO2014/155992
PCT Pub. Date: Oct. 2, 2014

(65) Prior Publication Data
US 2016/0049692 A1    Feb. 18, 2016

(30) Foreign Application Priority Data
Mar. 27, 2013  (JP) ................. 2013-066019

(51) Int. Cl.
*H01M 10/0569* (2010.01)
*H01M 4/485* (2010.01)

(52) U.S. Cl.
CPC ....... *H01M 10/0569* (2013.01); *H01M 4/485* (2013.01); *H01M 2220/20* (2013.01); *H01M 2220/30* (2013.01); *H01M 2300/004* (2013.01)

(58) Field of Classification Search
CPC ............................................... H01M 10/0569
(Continued)

(56) References Cited

U.S. PATENT DOCUMENTS

| 2003/0049541 A1 | 3/2003 | Inagaki et al. |
| 2010/0015509 A1 | 1/2010 | Inagaki et al. |

(Continued)

FOREIGN PATENT DOCUMENTS

| CN | 101512823 A | 8/2009 |
| JP | 8-64241 A | 3/1996 |

(Continued)

OTHER PUBLICATIONS

Office Action dated Sep. 26, 2016, issued in counterpart Chinese Patent Application No. 201480018546.8, with English translation of the Search Report. (9 pages).

(Continued)

*Primary Examiner* — Basia Ridley
*Assistant Examiner* — James Erwin
(74) *Attorney, Agent, or Firm* — Westerman, Hattori, Daniels & Adrian, LLP

(57) ABSTRACT

A nonaqueous electrolyte secondary battery is provided with: a positive electrode; a negative electrode that contains lithium titanate; a separator that is interposed between the positive electrode and the negative electrode; and a nonaqueous electrolyte that contains an electrolyte salt and a nonaqueous solvent. The nonaqueous solvent contains propylene carbonate, a chain carbonate A represented by general formula $R_1OCOOR_2$ (wherein each of $R_1$ and $R_2$ represents an alkyl group having 2 or more carbon atoms), and a chain carbonate B represented by general formula $R_3OCOOR_4$ (wherein $R_3$ represents a methyl group and $R_4$ represents an alkyl group). The volume fraction of the propylene carbonate in the nonaqueous solvent is within the range of 25-33% by volume; the volume fraction of the chain carbonate A in the nonaqueous solvent is within the range of 65-74% by volume; and the volume fraction of the
(Continued)

chain carbonate B in the nonaqueous solvent is within the range of 1-10% by volume.

3 Claims, 4 Drawing Sheets

(58) Field of Classification Search
USPC .......................................................... 429/332
See application file for complete search history.

(56) References Cited

U.S. PATENT DOCUMENTS

| | | | |
|---|---|---|---|
| 2010/0178570 | A1 | 7/2010 | Kozono et al. |
| 2012/0321940 | A1* | 12/2012 | Kawasaki ............. H01M 4/131 |
| | | | 429/163 |
| 2012/0321964 | A1* | 12/2012 | Hasegawa .............. H01G 11/60 |
| | | | 429/326 |

FOREIGN PATENT DOCUMENTS

| | | |
|---|---|---|
| JP | 2003-86177 A | 3/2003 |
| JP | 2003-242966 A | 8/2003 |
| JP | 2007-294164 A | 11/2007 |
| JP | 2009-129632 A | 6/2009 |
| JP | 2013-41844 A | 2/2013 |
| JP | 2013-173821 A | 9/2013 |
| WO | 2008/029899 A1 | 3/2008 |

OTHER PUBLICATIONS

International Search Report dated Apr. 8, 2014, issued in counterpart International Application No. PCT/JP2014/001256 (2 pages).
Notification of Transmittal of Translation of the International Preliminary Report on Patentability (Form PCT/IB/338) issued in counterpart International Application No. PCT/JP2014/001256 dated Oct. 8, 2015, with Forms PCT/IB/373, PCT/ISA/237 and PCT/IB/326 (13 pages).

* cited by examiner

NONAQUEOUS ELECTROLYTE SECONDARY BATTERY

TECHNICAL FIELD

The present invention relates to a technology of a nonaqueous electrolyte secondary battery including a negative electrode that contains lithium titanate.

BACKGROUND ART

Currently, a nonaqueous electrolyte secondary battery represented by a lithium ion secondary battery has been widely used for consumer applications such as small portable devices because of its high energy density. In a general lithium ion secondary battery, a transition metal oxide such as $LiCoO_2$ has been used as a positive electrode active material, a carbon material such as graphite has been used as a negative electrode active material, and a nonaqueous electrolyte obtained by dissolving an electrolyte salt such as $LiPF_6$ in a nonaqueous solvent such as a carbonic acid ester has been used as an electrolyte solution.

Moreover, lithium titanate that allows absorbing/desorbing reaction of the lithium ions to occur at an electric potential relative to that of lithium of about 1.5 V, the electric potential being nobler when lithium titanate is compared with carbon materials, has been proposed as a negative electrode active material.

In Patent Literature 1 for example, a nonaqueous electrolyte secondary battery using lithium titanate as a negative electrode active material and using, as a nonaqueous solvent for nonaqueous electrolytes, a mixed solvent of a cyclic carbonate such as propylene carbonate and a chain carbonate such as diethyl carbonate has been proposed.

Moreover, in Patent Literature 2 for example, a nonaqueous electrolyte secondary battery using lithium titanate as a negative electrode active material and using, as a nonaqueous solvent for nonaqueous electrolytes, a mixed solvent of a cyclic carbonate, dimethyl carbonate, and an ethyl methyl carbonate has been proposed.

CITATION LIST

Patent Literature

PATENT LITERATURE 1: Japanese Patent Laid-Open Publication No. 2013-173821
PATENT LITERATURE 2: Japanese Patent Laid-Open Publication No. 2003-242966

SUMMARY OF INVENTION

Technical Problem

Now, expectations for making nonaqueous electrolyte secondary batteries medium-sized or large-sized to apply them to a power source for electric power storage facilities and to a power source for vehicles such as an HEV have been increasing in recent years. Excellent cyclability as well as high reliability have been required in applying the nonaqueous electrolyte secondary batteries to such uses.

However, in the case where lithium titanate is used as a negative electrode active material, gas generation due to decomposition of the nonaqueous electrolyte is increased during charge and discharge of the nonaqueous electrolyte secondary battery depending on the kind, mixing ratio, or the like of nonaqueous solvents, and becomes a cause of lowering the reliability due to an increase in internal pressure of the secondary battery or the like, and further becomes a cause of lowering the cyclability.

Thus, it is an object of the present invention to provide a nonaqueous electrolyte secondary battery that suppresses the gas generation due to the decomposition of the nonaqueous electrolyte and also suppresses the lowering of the cyclability.

Solution to Problem

The nonaqueous electrolyte secondary battery of an embodiment of the present invention includes: a positive electrode; a negative electrode containing lithium titanate; a separator interposed between the positive electrode and the negative electrode; and a nonaqueous electrolyte containing an electrolyte salt and a nonaqueous solvent, in which the nonaqueous solvent contains: propylene carbonate; a chain carbonate A represented by the general formula $R_1OCOOR_2$ (where $R_1$ and $R_2$ represent an alkyl group having 2 or more carbon atoms); and a chain carbonate B represented by the general formula $R_3OCOOR_4$ (where $R_3$ represents a methyl group, and $R_4$ represents an alkyl group), the volume fraction of propylene carbonate in the nonaqueous solvent is in the range of 25 to 33 volume %, the volume fraction of the chain carbonate A in the nonaqueous solvent is in the range of 65 to 74 volume %, and the volume fraction of the chain carbonate B in the nonaqueous solvent is in the range of 1 to 10 volume %.

Advantageous Effects of Invention

According to the present invention, a nonaqueous electrolyte secondary battery that suppresses the gas generation due to decomposition of the nonaqueous electrolyte and suppresses lowering of the cyclability may be provided.

DESCRIPTION OF EMBODIMENT

Hereinafter, an embodiment of the present invention will be explained. The present embodiment is an example of practicing the present invention, and the present invention is not limited to the present embodiment.

Figure 1:
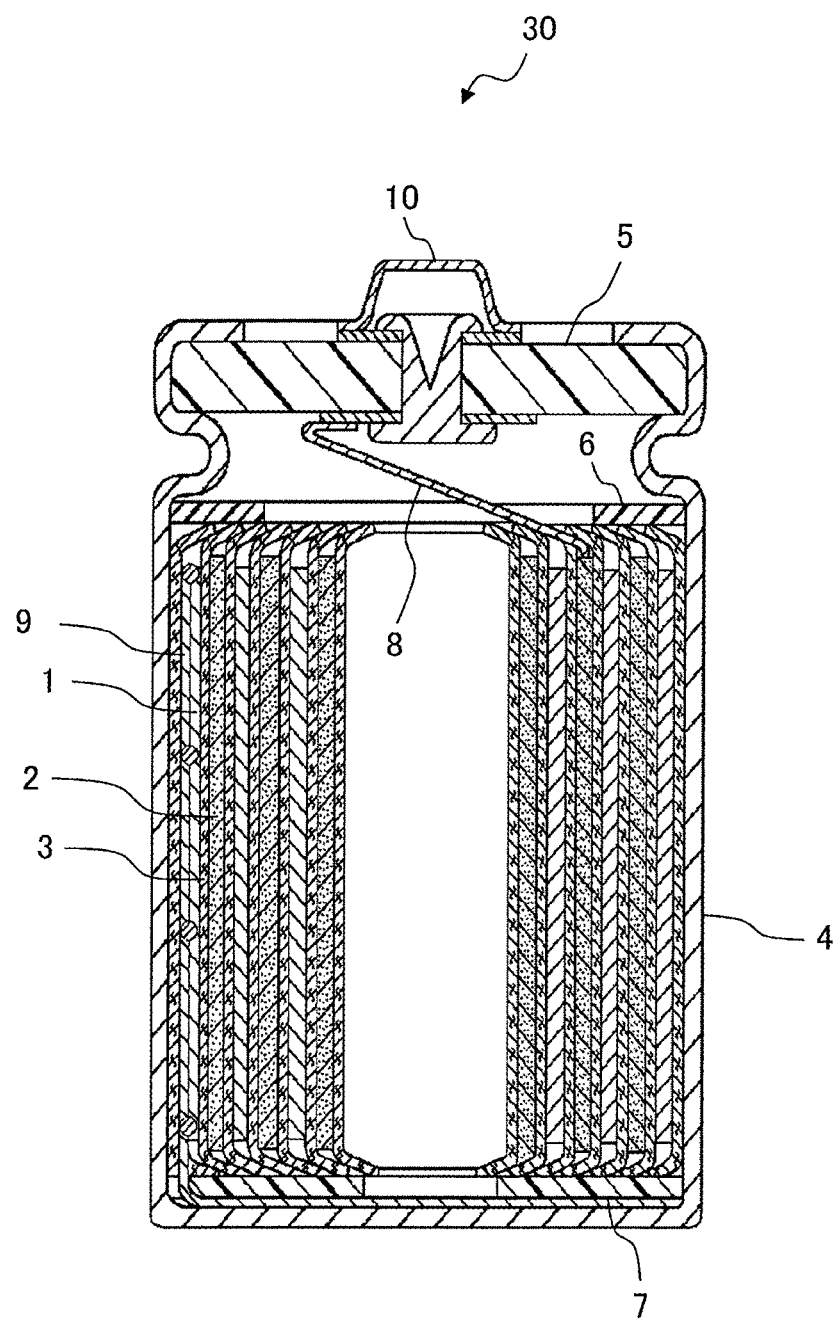
FIG. 1 is a schematic sectional view illustrating an example of the constitution of a nonaqueous electrolyte secondary battery according to the present embodiment.

FIG. 1 is a schematic sectional view illustrating an example of the constitution of a nonaqueous electrolyte secondary battery according to the present embodiment. The nonaqueous electrolyte secondary battery 30 illustrated in FIG. 1 includes a negative electrode 1, a positive electrode 2, a separator 3 interposed between the negative electrode 1 and the positive electrode 2, a nonaqueous electrolyte (electrolyte solution), a cylindrical battery case 4, and a sealing plate 5. The nonaqueous electrolyte is injected in the battery case 4. The negative electrode 1 and the positive electrode 2 are wound with the separator 3 interposed therebetween, and constitute a wound type electrode group together with the separator 3. An upper insulating plate 6 and a lower insulating plate 7 are installed at both ends in a longitudinal direction of the wound type electrode group, and housed in the battery case 4. One end of a positive electrode lead 8 is connected to the positive electrode 2, and the other end of the positive electrode lead 8 is connected to a positive electrode terminal 10 that is provided with the sealing plate 5. One end of a negative electrode lead 9 is connected to the negative electrode 1, and the other end of the negative electrode lead 9 is connected to the internal bottom of the battery case 4. The connection between leads and members is conducted by welding or the like. An open end of the battery case 4 is crimped onto a sealing plate 5 to seal the battery case 4.

The negative electrode 1 includes a negative electrode collector and a negative electrode active material layer provided on the negative electrode collector. The negative electrode active material layer is preferably arranged on both faces of the negative electrode collector, but may be provided on one face of the negative electrode collector. The negative electrode active material layer contains a negative electrode active material, and may also contain a negative electrode additive or the like added therein in addition to the negative electrode active material.

The negative electrode active material contains lithium titanate. Lithium titanate is preferably, for example, lithium titanate represented by the chemical formula $Li_{4+x}Ti_5O_{12}$ ($0 \leq x \leq 3$) from the viewpoint of suppressing the gas generation and suppressing the lowering of the cyclability, more preferably lithium titanate represented by $Li_4Ti_5O_{12}$. In addition, lithium titanate in which a part of Ti or Li is substituted for another element such as, for example, Fe or Mn may be used. Furthermore, the lithium titanate may contain Na, K, Si, B, Al, P, Cl or Mb.

The negative electrode active material may contain a publicly known negative electrode active material used for nonaqueous electrolyte secondary batteries such as a lithium ion battery in addition to the lithium titanate, and examples thereof include carbon-based active materials and silicon-based active materials containing silicon. Examples of the carbon-based active material include artificial graphite, natural graphite, hardly graphitizable carbon and easily graphitizable carbon. Examples of the silicon-based active material include silicon, silicon compounds and partially substituted compounds or solid solutions thereof. The silicon compound is preferably, for example, silicon oxides represented by $SiO_a$ (where $0.05 < a < 1.95$).

The negative electrode additive is, for example, a binder and a conductive agent. Examples of the conductive agent include carbon black such as acetylene black and graphite and fibrous carbon. Moreover, examples of the binder include fluorine-based resins such as polytetrafluoroethylene (PTFE), polyvinylidene fluoride (PVdF), and fluorine-based rubber, and styrene-butadiene rubber and polyacrylic acids.

The negative electrode collector is constituted by, for example, a publicly known conductive material used for nonaqueous electrolyte secondary batteries such as a lithium ion battery, and examples of the negative electrode collector include nonporous conductive substrates, such as a metal foil. The metal foil is preferably, for example, a copper foil or an aluminum foil. The thickness of the negative electrode collector is preferably in the range of, for example, about 1 μm or more and about 500 μm or less.

The nonaqueous electrolyte used in the present embodiment contains a supporting electrolyte salt and a nonaqueous solvent.

And the nonaqueous solvent contains propylene carbonate, a chain carbonate A represented by the general formula $R_1OCOOR_2$ (where $R_1$ and $R_2$ represent an alkyl group having 2 or more carbon atoms), and a chain carbonate B represented by the general formula $R_3OCOOR_4$ (where $R_3$ represents a methyl group, and $R_4$ represents an alkyl group), and the gas generation may be reduced and the lowering of the cyclability may be suppressed by using such a nonaqueous solvent.

Here, the mechanism of reducing the gas generation and suppressing the lowering of the cyclability is explained. Propylene carbonate is a suitable nonaqueous solvent from the viewpoint of viscosity, conductivity, and so on, however it is considered that the gas generation occurs as a result of the decomposition of propylene carbonate due to reaction with lithium titanate during charge and discharge. Although the gas generation is reduced when propylene carbonate is used compared with ethylene carbonate that is widely used as a solvent for nonaqueous electrolytes used for batteries using carbon-based negative electrode such as graphite, the gas generation is still one of the problems. However, when the chain carbonate A and the chain carbonate B are added, the gas generation may be further reduced. This is considered to be due to the following effect. When the chain carbonate A and the chain carbonate B are added, these carbonates react with lithium titanate to decompose before propylene carbonate reacts with lithium titanate, and therefore a coating film is formed on the lithium titanate. It is considered that the gas generation due to the decomposition of the nonaqueous electrolyte is suppressed more than in the case where propylene carbonate alone is used as a nonaqueous solvent because the coating film protects the lithium titanate surface to thereby suppress the decomposition of propylene carbonate. The chain carbonate B in particular has one or more methyl groups having 1 carbon atom, while the chain carbonate A has alkyl groups each having 2 or more carbon atoms as an alkyl group that bind to both ends of the carbonate group. The methyl group has a smaller steric hindrance effect than the alkyl group having 2 or more carbon atoms, and therefore the chain carbonate B has a higher reactivity than the chain carbonate A. It is considered from this fact that the coating film derived mainly from the chain carbonate B is formed on the lithium titanate because the chain carbonate B reacts with lithium titanate to decompose more preferentially than the chain carbonate A not having a methyl group. It is considered that the gas generation due to the decomposition of the nonaqueous electrolyte is suppressed more than in the case where the mixed solvent of propylene carbonate and the chain carbonate A is used as a nonaqueous solvent because the decomposition of propylene carbonate and the chain carbonate A are suppressed by the formation of the coating film derived from the chain carbonate B. However, when the content of the chain carbonate B becomes large, gas generation due to the decomposition of the chain carbonate itself is increased. Furthermore, the amount of coating film formed on lithium titanate becomes large to bring about the lowering of the cyclability. On the other hand, when the content of propylene carbonate becomes large, not only is the gas generation due to the decomposition of propylene carbonate increased, but also the battery performance such as low temperature properties and highly rate charge and discharge properties is lowered because propylene carbonate has a higher viscosity compared with the chain carbonate A and the chain carbonate B to therefore lower the conductivity of the nonaqueous electrolyte. Moreover, propylene carbonate is a solvent having a high dielectric constant and therefore exhibits an effect of dissociating anions and cations of the supporting electrolyte salt, being a solute, to enhance the conductivity with these disassociated ions, but in the case where the content of propylene carbonate becomes small, the dissociation of the supporting electrolyte salt is suppressed, and therefore the conductivity of the nonaqueous electrolyte is lowered to similarly bring about the lowering of the battery performance. With respect to whether the content of the chain carbonate A is large or small, the direct influence on the battery performance is small, but since the content of propylene carbonate and the content of the chain carbonate B increase or decrease relatively depending on the content of the chain carbonate A, the deterioration of the battery performance due to the above-described reason will be brought about. In the case where only the chain carbonate A is contained as the chain carbonate and the chain carbonate B is not contained, the formed coating film is insufficient, and therefore the decomposition of the carbonates themselves is not sufficiently suppressed which increases the gas generation or lowers the cyclability. Thus, based on these findings, the present inventors have reached the present invention to provide a nonaqueous electrolyte secondary battery that may suppress the gas generation and the lowering of the cyclability in the case where the contents of propylene carbonate, the chain carbonate A, and the chain carbonate B are adjusted in an appropriate range, and lithium titanate is used as a negative electrode. Also, the contents of propylene carbonate, the chain carbonate A, and the chain carbonate B in the present embodiment are as follows.

The volume fraction of propylene carbonate in the nonaqueous solvent is in the range of 25 to 33 volume %, the volume fraction of the chain carbonate A in the nonaqueous solvent is in the range of 65 to 74 volume %, and the volume fraction of the chain carbonate B in the nonaqueous solvent is in the range of 1 to 10 volume %. In the case where lithium titanate is contained in the negative electrode active material, the gas generation due to the decomposition of the nonaqueous electrolyte may be suppressed and the lowering of the cyclability may also be suppressed by making the volume fraction of propylene carbonate in the nonaqueous solvent in the range of 25 to 33 volume %, the volume fraction of the chain carbonate A in the nonaqueous solvent in the range of 65 to 74 volume %, and the volume fraction of the chain carbonate B in the nonaqueous solvent in the range of 1 to 10 volume %.

When the volume fraction of propylene carbonate in the nonaqueous solvent is less than 25 volume %, the battery performance of the nonaqueous electrolyte secondary battery is lowered due to reduction in the conductivity of the nonaqueous electrolyte caused by an increase in the viscosity of the nonaqueous electrolyte or lowering in the degree of dissociation of the supporting electrolyte salt or the like. Moreover, when the volume fraction of propylene carbonate in the nonaqueous solvent exceeds 33 volume %, the quantity of the reaction with lithium titanate is increased, and therefore a larger amount of propylene carbonate decomposes to bring about the generation of a large amount of gas. When the volume fraction of the chain carbonate A in the nonaqueous solvent is less than 65 volume % or the volume fraction of the chain carbonate B is less than 1 volume %, the decomposition of propylene carbonate is not sufficiently suppressed, and the gas generation and the lowering of the cyclability may not be suppressed. When the volume fraction of the chain carbonate A in the nonaqueous solvent exceeds 75 volume %, the volume fraction of the propylene carbonate in the nonaqueous solvent relatively becomes less than 25 volume % to bring about the lowering of the battery performance due to the above-described reason. Moreover, when the volume fraction of the chain carbonate B exceeds 10 volume %, the increase in gas generation due to the decomposition of the chain carbonate B itself and the lowering of the cyclability may not be suppressed.

Examples of the chain carbonate A represented by the general formula $R_1OCOOR_2$ (where $R_1$ and $R_2$ represent an alkyl group having 2 or more carbon atoms) include diethyl carbonate, ethyl isopropyl carbonate, dipropyl carbonate, diisopropyl carbonate, dibutyl carbonate and a mixture containing at least two thereof, and the chain carbonate A is preferably diethyl carbonate from the viewpoint of suppressing the lowering of the cyclability, or the like and also from the viewpoint of viscosity or the like that has an influence on the conductivity of the nonaqueous electrolyte. Moreover, examples of the chain carbonate B represented by the general formula $R_3OCOOR_4$ (where $R_3$ represents a methyl group, and $R_4$ represents an alkyl group) include dimethyl carbonate, ethyl methyl carbonate and methyl propyl carbonate, and the chain carbonate B is preferably dimethyl carbonate, ethyl methyl carbonate or a mixture thereof from the viewpoint of reducing the gas generation due to the decomposition of the nonaqueous electrolyte, or the like. Furthermore, the chain carbonate B is more preferably dimethyl carbonate that has a methyl group at both ends thereof and is considered to have a higher reactivity.

The nonaqueous solvent of the present embodiment is not limited to contain another solvent as specifically described above and may contain, for example, a cyclic ether such as tetrahydrofuran (THF) and 2-methyl tetrahydrofuran (2MeTHF); a chain ether such as dimethoxyethane (DME); γ-butyrolactone (GBL), acetonitrile (AN), sulfolane (SL), and various ionic liquids, or various normal-temperature molten salts.

The supporting electrolyte salt used in the present embodiment is not particularly limited, and the supporting electrolyte salts such as, for example, $LiClO_4$, $LiBF_4$, $LiAsF_6$, $LiPF_6$, $LiPF(CF_3)_5$, $LiPF_2(CF_3)_4$, $LiPF_3(CF_3)_3$, $LiPF_4(CF_3)_2$, $LiPF_5(CF_3)$, $LiPF_3(C_2F_5)_3$, $LiCF_3SO_3$, $LiN(CF_3SO_2)_2$, $LiN(C_2F_5SO_2)_2$, $LiN(C_2F_5CO)_2$, $LiI$, $LiAlCl_4$, and $LiBC_4O_8$ may be used alone or in combination of two or more.

Among others, $LiPF_6$ is preferably used because the ion conductivity of the nonaqueous electrolyte becomes favorable. The concentration of these supporting electrolyte salts is preferably set to 0.5 to 2.0 mol/L. Furthermore, the concentration of the supporting electrolyte salts is more preferably set to 1.5 to 2.0 mol/L. Moreover, the electrolyte salt may also be used when at least one selected from the group consisting of carbonates such as vinylene carbonate and butylene carbonate, compounds having a benzene ring such as biphenyl and cyclohexylbenzene, sulfur-containing compounds such as propane sultone, propene sultone, and ethylene sulfide, hydrogen fluoride, triazole-based cyclic compounds, fluorine-containing esters, a hydrogen fluoride complex of tetraethylammonium fluoride and derivatives thereof, phosphazene and derivatives thereof, amide group-containing compounds, imino group-containing compounds, and nitrogen-containing compounds is contained in the electrolyte salt. Moreover, the electrolyte salt may also be used when at least one selected from $CO_2$, $NO_2$, $CO$, $SO_2$, and the like is contained therein.

The positive electrode 2 includes a positive electrode collector and a positive electrode active material layer. The positive electrode active material layer is preferably arranged on both faces of the positive electrode collector, but may be arranged only on one face side of the positive electrode collector. The positive electrode active material layer contains a positive electrode active material, and may also contain a positive electrode additive added therein in addition to the positive electrode active material.

Examples of the positive electrode active material include publicly known positive electrode active materials used for nonaqueous electrolyte secondary batteries such as a lithium ion secondary battery, such as: lithium-containing composite metal oxides; layered oxides such as lithium cobaltate ($LiCoO_2$), lithium nickel cobalt manganate ($LiNiCoMnO_2$), and lithium nickel cobalt aluminate ($LiNiCoAlO_2$); and spinel composite oxides such as lithium manganate ($LiMn_2O_4$). The positive electrode active materials preferably include layered oxides having a high volume energy density, such as lithium cobaltate ($LiCoO_2$), lithium nickel cobalt manganate ($LiNiCoMnO_2$), and lithium nickel cobalt aluminate ($LiNiCoAlO_2$).

The positive electrode additive is, for example, a binder or a conductive agent. As the binder and the conductive agent, the same substances as is used for the negative electrode 1 may be used.

The positive electrode collector is constituted by, for example, a publicly known conductive material used for nonaqueous electrolyte secondary batteries such as a lithium ion battery, and examples thereof include nonporous conductive substrates such as a metal foil. The metal foil is preferably, for example, an aluminum foil. The thickness of the positive electrode collector is preferably in the range of, for example, about 1 μm or more and about 500 μm or less.

As the separator 3, for example, microporous membranes or nonwoven fabrics made of polyolefins, aramid resins, or the like, sheets obtained by beating and paper-making cellulose fiber, having a predetermined ion permeability, mechanical strength, insulation properties, and so on are used. The thickness of the separator 3 is preferably in the range of, for example, about 10 μm or more and about 300 μm or less. Moreover, the porosity of the separator 3 is preferably in the range of about 30% or more and 70% or less. In addition, the porosity represents percentages of the total volume of pores that are contained in the separator 3 relative to the volume of the separator 3.

In addition, the nonaqueous electrolyte secondary battery 30 in FIG. 1 is a cylindrical battery including a winding type electrode group, but the shape of the battery is not particularly limited, and the battery may be, for example, a square battery, a flat battery, a coin battery, or a laminated film pack battery.

EXAMPLES

Hereinafter, the present invention will further be explained by Examples, but the present invention is not limited to the Examples.

Example 1

[Manufacture of Positive Electrode Active Material]

As a positive electrode material, $LiNi_{0.80}Co_{0.15}Al_{0.05}O_2$ was prepared. First of all, an alkaline solution containing sodium hydroxide was dropped into an aqueous solution obtained by dissolving nickel sulfate and cobalt sulfate in a predetermined ratio to obtain a hydroxide precipitate. The hydroxide was dispersed in a $NaAlO_2$ aqueous solution, and the resultant dispersion was neutralized with sulfuric acid to thereby uniformly deposit aluminum hydroxide on the surface of the hydroxide. Thereafter, the resultant material was fired in the air atmosphere at 700° C. for 10 hours to obtain $[Ni_{0.80}Co_{0.15}Al_{0.05}]O$ as a ternary system oxide. Furthermore, a lithium hydroxide monohydrate powder was mixed with the obtained oxide so that the ratio of the total number of moles of Ni, Co, and Al to the number of moles of lithium was 1:1, then the temperature was raised in the oxygen atmosphere to 750° C. in 10 hours, and heat treatment at 750° C. was applied to the resultant mixture for 36 hours to obtain the intended $LiNi_{0.80}Co_{0.15}Al_{0.05}O_2$.

[Manufacture of Positive Electrode]

The positive electrode active material ($LiNi_{0.80}Co_{0.15}Al_{0.05}O_2$) obtained in a manner as described above, an acetylene black powder as a conductive agent, and polyvinylidene fluoride (PVdF) as a binder were mixed so that the mass ratio of the active material, the conductive agent, and the binder was 100:3:4, thereafter N-methyl-2-pyrrolidone as a dispersion medium was added thereto, and the resultant mixture was kneaded to prepare a positive electrode slurry. The positive electrode slurry was applied on both faces of an aluminum foil (thickness 15 μm) as a positive electrode collector and dried to manufacture positive electrode active material layers on the aluminum foil, and thereafter the positive electrode active material layers on the aluminum foil were rolled with a rolling roller to manufacture a positive electrode. An aluminum positive electrode lead was attached to the obtained positive electrode.

[Manufacture of Negative Electrode Active Material]

As a negative electrode material, $Li_4Ti_5O_{12}$ was prepared. Titanium dioxide and lithium hydroxide were mixed, and thereafter heat treatment was conducted in the air at 850° C. for 15 hours to thereby obtain the intended $Li_4Ti_5O_2$.

[Manufacture of Negative Electrode]

The negative electrode active material ($Li_4Ti_5O_{12}$), an acetylene black powder as a conductive agent, and polyvinylidene fluoride (PVdF) as a binder were mixed so that the mass ratio of the active material, the conductive agent, and the binder was 100:3:4, thereafter N-methyl-2-pyrrolidone as a dispersion medium was added thereto, and the resultant mixture was kneaded to prepare a negative electrode slurry. The negative electrode slurry was applied on both faces of an aluminum foil (thickness 15 μm) as a negative electrode collector and dried to manufacture negative electrode active material layers on the aluminum foil, and thereafter the negative electrode active material layers on the aluminum foil were rolled with a rolling roller to manufacture a negative electrode. An aluminum negative electrode lead was attached to the obtained negative electrode.

[Preparation of Nonaqueous Electrolyte]

In each of mixed solvents obtained by mixing (1) 75 volume % of diethyl carbonate, (2) 70 volume % of diethyl carbonate and 5 volume % of dimethyl carbonate, (3) 65 volume % of diethyl carbonate and 10 volume % of dimethyl carbonate, (4) 60 volume % of diethyl carbonate and 15 volume % of dimethyl carbonate, and (5) 55 volume % of diethyl carbonate and 20 volume % of dimethyl carbonate with propylene carbonate whose amount was fixed to 25 volume %, lithium hexafluorophosphate ($LiPF_6$) as a supporting electrolyte salt was dissolved so that the concentration of the lithium hexafluorophosphate was 1.2 mol/L to prepare nonaqueous electrolytes 1 to 5.

[Test Cell]

The positive electrode and negative electrode manufactured as described above were laminated with a separator interposed therebetween, and the obtained laminated product was wound to manufacture an electrode group. The electrode group was housed in an aluminum laminate film container as an exterior body, then each of the aforementioned nonaqueous electrolytes 1 to 5 was injected into the aluminum laminate film container in which the aforementioned electrode group was housed, and thereafter the opening of the aluminum laminate film container was tightly sealed by heat seal to manufacture test cells 1 to 5. The positive electrode lead and the negative electrode lead were taken out to the outside of the container through the heat-sealed portion while maintaining the sealing properties.

[Evaluation of Cyclability of Test Cells 1 to 5]

The test cells 1 to 5 were housed in a thermostatic chamber at 20° C., and charged and discharged by a constant current/constant voltage system as described below. Each of the test cells 1 to 5 was charged at a constant current of 1 C rate (1 C is defined as a value of current at which the whole battery capacity can be consumed in 1 hour) until the battery voltage became 2.8 V. After the battery voltage reached 2.8 V, each test cell was charged at a constant voltage of 2.8 V until the current value became 0.05 C. Next, the charge was suspended for 20 minutes, and thereafter the test cell after charging was discharged at a constant current of 1.0 C rate being a high rate until the battery voltage became 1.5 V. Such charge and discharge were repeated 800 cycles. The ratio of the total discharging capacity of each cycle to the total discharging capacity at the first cycle (a value determined by a percentage value) was calculated and denoted as the discharging capacity retention ratio, and the resultant discharging capacity retention ratios are shown together in FIG. 2. It can be said that the cyclability becomes lower as the discharging capacity retention ratio becomes lower.

[Evaluation of Gas Generation of Test Cells 1 to 5]

Volume of each of the test cells 1 to 5 before charge and discharge was measured, the charge and discharge were repeated for 300 cycles in the same constant current/constant voltage system as mentioned before, and then the volume of each of the test cells 1 to 5 after 300 cycles was measured. The ratio (determined as a percentage value) of the volume of each of the test cells 1 to 5 after 300 cycles to the volume of each of the test cells 1 to 5 before the charge and discharge was calculated and denoted as the cell volume increase ratio, and the resultant cell volume increase ratios are shown together in FIG. 3. It can be said that the battery expanded more due to the gas generation inside the test cell as the cell volume increase ratio became larger.

Figure 2:
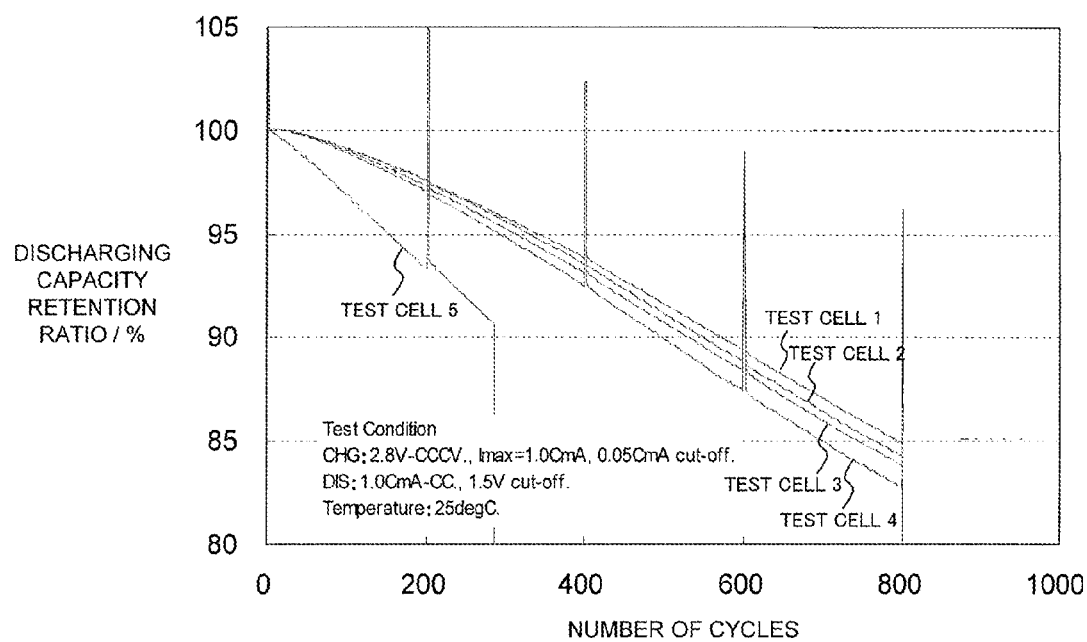
FIG. 2 is a view showing results of the cyclability of test cells 1 to 5.
Figure 3:
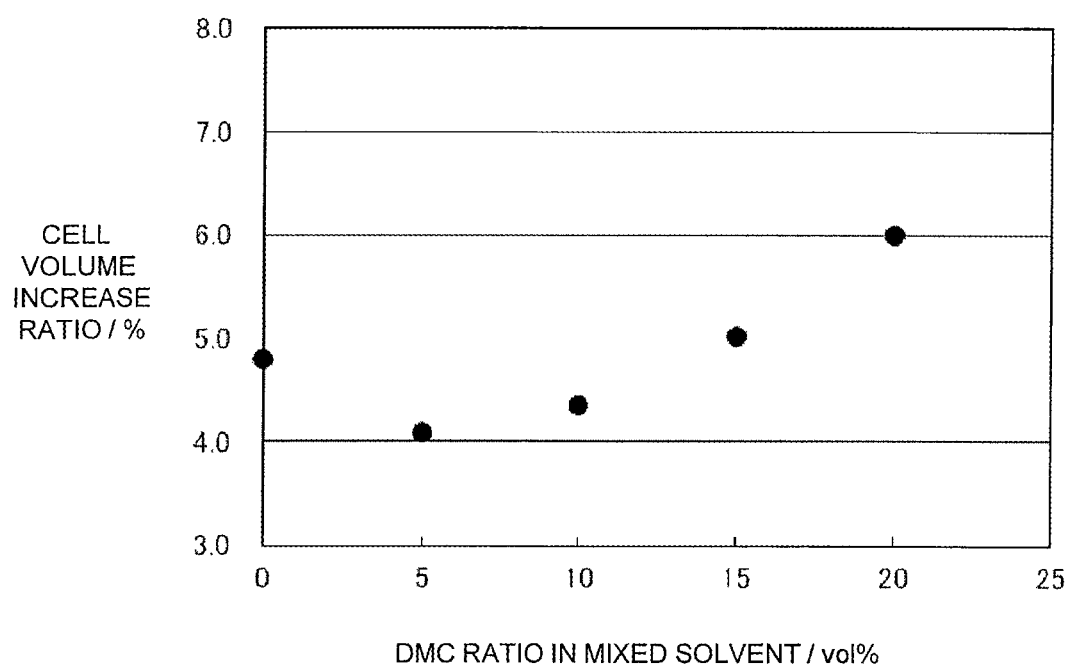
FIG. 3 is a view showing results of cell volume increase ratios of test cells 1 to 5.

FIG. 2 is a view showing the results of the cyclability of the test cells 1 to 5, and FIG. 3 is a view showing the results of cell volume increase ratios of the test cells 1 to 5.

As shown in FIG. 2 and FIG. 3, in the test cell 2 where the mixed solvent of 25 volume % of propylene carbonate, 70 volume % of diethyl carbonate, and 5 volume % of dimethyl carbonate was used, and the test cell 3 where the mixed solvent of 25 volume % of propylene carbonate, 65 volume % of diethyl carbonate, and 10 volume % of dimethyl carbonate was used, the gas generation was suppressed more than in the other test cells, and moreover the lowering of the cyclability was suppressed in the same way as in the test cell 1 where the mixed solvent of 25 volume % of propylene carbonate and 75 volume % of diethyl carbonate was used. Moreover, in the test cell 4 where the mixed solvent of 25 volume % of propylene carbonate, 60 volume % of diethyl carbonate, and 15 volume % of dimethyl carbonate was used, and the test cell 5 where the mixed solvent of 25 volume % of propylene carbonate, 55 volume % of diethyl carbonate, and 20 volume % of dimethyl carbonate was used, the gas generation was increased more than the test cell 1 where dimethyl carbonate was not added, and the lowering of the cyclability was also not able to be suppressed more than test cell 1.

Example 2

Test cells similar to those of Example 1 were manufactured except that in each of mixed solvents obtained by mixing (6) 25 volume % of propylene carbonate and 75 volume % of diethyl carbonate, (7) 33 volume % of propylene carbonate and 66 volume % of diethyl carbonate, (8) 40 volume % of propylene carbonate and 60 volume % of diethyl carbonate, (9) 45 volume % of propylene carbonate and 55 volume % of diethyl carbonate, (10) 50 volume % of propylene carbonate and 50 volume % of diethyl carbonate, (11) 55 volume % of propylene carbonate and 45 volume % of diethyl carbonate, (12) 60 volume % of propylene carbonate and 40 volume % of diethyl carbonate, and (13) 90 volume % of propylene carbonate and 10 volume % of diethyl carbonate, lithium hexafluorophosphate ($LiPF_6$) was dissolved so that the concentration of the lithium hexafluorophosphate was 1.2 mol/L to prepare nonaqueous electrolytes 6 to 13. These test cells were denoted as test cells 6 to 13 respectively.

The volume of each of the test cells 6 to 13 before charge and discharge was measured, the charge and discharge were repeated for 300 cycles in the same constant current/constant voltage system as the aforementioned system, and then the volume of each of the test cells 6 to 13 after 300 cycles was measured. The ratio (determined as a percentage value) of the volume of each of the test cells 6 to 13 after 300 cycles to the volume of each of the test cells 6 to 13 before the charge and discharge was calculated and denoted as the cell volume increase ratio, and the resultant cell volume increase ratios are shown together in FIG. 4.

Figure 4:
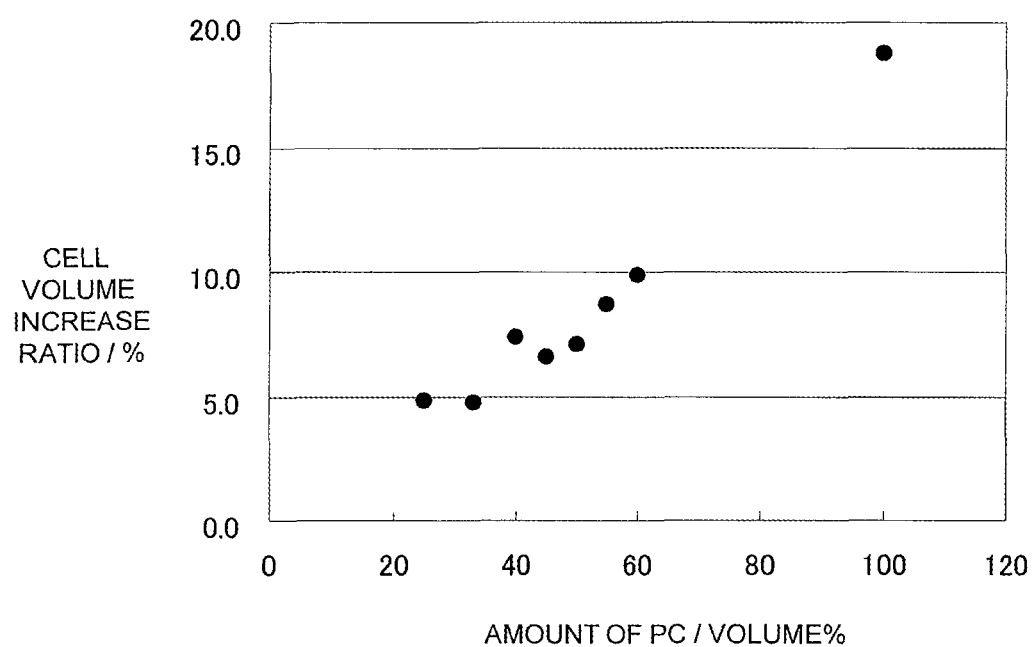
FIG. 4 is a view showing results of cell volume increase ratios of test cells 6 to 13.

FIG. 4 is a view showing the results of the cell volume increase ratios of the test cells 6 to 13. As shown in FIG. 4, in the test cells 6 and 7 using the mixed solvents where propylene carbonate was set to be 33 volume % or less, the gas generation was suppressed more than in the other cells using the mixed solvents where propylene carbonate was set to be more than 33 volume %. However, the gas generation was increased in the test cells 6 and 7 compared with the gas generation in the test cell 2 evaluated in Example 1 and using the mixed solvent of 25 volume % of propylene carbonate, 70 volume % of diethyl carbonate, and 5 volume % of dimethyl carbonate, and the test cell 3 also evaluated in Example 1 and using the mixed solvent of 25 volume % of propylene carbonate, 65 volume % of diethyl carbonate, and 10 volume % of dimethyl carbonate.

From the results of Example 1 and Example 2, it is necessary from the viewpoint of suppressing the gas generation, or the like, that propylene carbonate principally be made in the range of 25 to 33 volume % and dimethyl carbonate (namely, the chain carbonate B represented by the general formula $R_3OCOOR_4$ (where $R_3$ represents a methyl group, and $R_4$ represents an alkyl group)) be made in the range of 1 to 10 volume %. It is also necessary from the viewpoint of the cyclability, or the like that diethyl carbonate (namely, the chain carbonate A represented by the general formula $R_1OCOOR_2$ (where $R_1$ and $R_2$ represent an alkyl group having 2 or more carbon atoms)) be principally made in the range of 66 to 74 volume %.

REFERENCE SIGNS LIST

1 Negative electrode
2 Positive electrode
3 Separator
4 Battery case
5 Sealing plate 6 Upper insulating plate
7 Lower insulating plate
8 Positive electrode lead
9 Negative electrode lead
10 Positive electrode terminal
30 Nonaqueous electrolyte secondary battery

The invention claimed is:

1. A nonaqueous electrolyte secondary battery, comprising:
  a positive electrode;
  a negative electrode comprising lithium titanate;
  a separator interposed between the positive electrode and the negative electrode; and
  a nonaqueous electrolyte comprising an electrolyte salt and a nonaqueous solvent,
  wherein the nonaqueous solvent comprises:
    propylene carbonate;
    a chain carbonate A represented by a general formula $R_1OCOOR_2$ (where $R_1$ and $R_2$ represent an alkyl group having 2 or more carbon atoms); and
    a chain carbonate B represented by a general formula $R_3OCOOR_4$ (where $R_3$ represents a methyl group, and $R_4$ represents an alkyl group),
    a volume fraction of the propylene carbonate in the nonaqueous solvent is in the range of 25 to 33 volume %,
    a volume fraction of the chain carbonate A in the nonaqueous solvent is in the range of 65 to 74 volume %, and
    a volume fraction of the chain carbonate B in the nonaqueous solvent is in the range of 1 to 10 volume %.

2. The nonaqueous electrolyte secondary battery according to claim 1, wherein the chain carbonate B is selected from dimethyl carbonate, ethyl methyl carbonate, and a mixture thereof.

3. The nonaqueous electrolyte secondary battery according to claim 1, wherein the chain carbonate A is diethyl carbonate.

* * * * *